US009643465B2

(12) United States Patent
De Vlugt et al.

(10) Patent No.: US 9,643,465 B2
(45) Date of Patent: May 9, 2017

(54) ANTI-SKATE DEVICE FOR APPLYING DAMPING TORQUE TO AN AXLE (71) Applicant: FORD GLOBAL TECHNOLOGIES, LLC, Dearborn, MI (US)

(72) Inventors: Alexander Rein De Vlugt, Wandana Heights (AU); Lauri Mikael Ohra-Aho, Lara (AU); Simon Johnson, Lara (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 31 days.

(21) Appl. No.: 14/554,779

(22) Filed: Nov. 26, 2014

(65) Prior Publication Data

US 2016/0144684 A1    May 26, 2016

(51) Int. Cl.
| | |
|---|---|
| *B60G 9/00* | (2006.01) |
| *B60G 13/18* | (2006.01) |
| *B60G 17/016* | (2006.01) |
| *B60G 21/08* | (2006.01) |
| *B60W 10/02* | (2006.01) |
| *F16F 15/14* | (2006.01) |

(52) U.S. Cl.
CPC .............. *B60G 9/00* (2013.01); *B60G 13/18* (2013.01); *B60G 17/0164* (2013.01); *B60G 21/08* (2013.01); *B60W 10/02* (2013.01); *F16F 15/1485* (2013.01); *B60G 2200/422* (2013.01); *B60G 2202/22* (2013.01); *B60G 2202/25* (2013.01); *B60G 2204/419* (2013.01); *B60G 2204/82* (2013.01); *B60G 2400/252* (2013.01); *B60G 2401/28* (2013.01); *B60G 2500/10* (2013.01); *B60G 2800/21* (2013.01)

(58) Field of Classification Search
CPC .............. B60G 21/00; B60G 2202/442; B60G 2500/10
See application file for complete search history.

(56) References Cited

U.S. PATENT DOCUMENTS

| | | | | | |
|---|---|---|---|---|---|
| 3,672,244 | A | * | 6/1972 | Nasvytis | ................ B60K 6/105 180/165 |
| 3,918,558 | A | * | 11/1975 | Bryant | .................... B60T 1/087 180/54.1 |

(Continued)

FOREIGN PATENT DOCUMENTS

| | | | | |
|---|---|---|---|---|
| CN | 2688972 Y | | 3/2005 | |
| CN | 102092278 | * | 6/2011 | ............. B60K 6/543 |

OTHER PUBLICATIONS

M. Ahmadian et al., "Can Semiactive Semiactive Dampers with Skyhook Control Improve Roll Stability of Passenger Vehicles?" Proceedings of the 2004 SAE Automotive Dynamics, Stability & Controls Conference May 4-6, 2004, Paper No. 2004-01-2099, copyright 2004, SAE International.

(Continued)

*Primary Examiner* — Faye M Fleming
(74) *Attorney, Agent, or Firm* — Jones Robb, PLLC; Raymond L. Coppiellie (57) ABSTRACT An anti-skate device for a drive axle of a motor vehicle may include a free-spinning body having an axis of rotation that is generally perpendicular to the drive axle of the vehicle. The free-spinning body may be coupled to the drive axle by a rotational damper.

17 Claims, 7 Drawing Sheets (56) References Cited

U.S. PATENT DOCUMENTS

| | | | | |
|---|---|---|---|---|
| 4,087,116 A | * | 5/1978 | Morimoto | B60G 9/00 |
| | | | | 280/124.104 |
| 4,196,786 A | | 4/1980 | Hornig et al. | |
| 4,495,836 A | * | 1/1985 | Cohen | B60K 6/105 |
| | | | | 180/165 |
| 2006/0040753 A1 | * | 2/2006 | Kai | F16C 3/026 |
| | | | | 464/179 |
| 2006/0108489 A1 | | 5/2006 | Hartgers et al. | |
| 2011/0290607 A1 | | 12/2011 | Teknos et al. | |
| 2013/0119665 A1 | * | 5/2013 | Berbari | B60L 11/16 |
| | | | | 290/50 |

OTHER PUBLICATIONS

Ali Zargartalebi et al., "Dynamic modelling of axle tramp in a sport type car", Shock and Vibration 20, 2013, pp. 711-723, DOI 10.3233/SAV-130779, IOS Press.

English language translation of CN 2688972Y, original document dated Mar. 30, 2005.

* cited by examiner

ANTI-SKATE DEVICE FOR APPLYING DAMPING TORQUE TO AN AXLE

TECHNICAL FIELD

The present disclosure relates generally relates to devices for improving vehicle stability.

BACKGROUND

Many conditions may result in vehicle instability. Although most vehicles today include systems directed to reducing and/or controlling such instability, for certain vehicles, such as, for example, vehicles that include a solid rear axle and/or have a body-on-frame construction, vehicle axle tramp may still be a problem.

A drive axle (e.g., a rear axle) of a vehicle can experience vehicle axle tramp motion due to various forces caused by an undulating road surface, combined with the rotational energy of a propeller shaft, which may cause the axle to oscillate at or near to its natural frequency, as dictated by the inertias, spring components and shock absorber elements of the suspension system. In an axle tramp motion, the drive axle may, for example, rotate around an axis parallel to a longitudinal axis of the vehicle in a manner that causes springs on opposite sides of the vehicle to respond independently from one another, thereby resulting in a rolling oscillation of the vehicle that causes reduced or lost tire contact with the road, a condition which may be known as "vehicle skate."

It may, therefore be desirable to provide devices and assemblies that may counteract vehicle skate.

SUMMARY

In accordance with various exemplary embodiments, an anti-skate device for a drive axle of a motor vehicle may include a free-spinning body having an axis of rotation that is generally perpendicular to the drive axle of the vehicle. The free-spinning body may be coupled to the drive axle by a rotational damper.

In accordance with various additional exemplary embodiments, an anti-skate assembly may include a flywheel rotatably coupled to a propeller shaft of a vehicle. The anti-skate assembly may further include a drive axle housing. A damping torque may be applied to the drive axle housing by selectively coupling the flywheel to the drive axle housing during a detected vehicle skate event to reduce a magnitude of an axle tramp motion.

In accordance with various further exemplary embodiments, a method of reducing a magnitude of an axle tramp motion of a motor vehicle may include coupling a rotational damping component to a drive axle of the motor vehicle. The method may further include applying a coupling torque between the rotational damping component and the drive axle that is proportional to a velocity of the axle tramp motion.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Turning now to the figures, at least some features and advantages of the present disclosure will be apparent from the following detailed description of exemplary embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various embodiments, examples of which are illustrated in the accompanying drawings. The descriptions of the various exemplary embodiments are not intended to limit the disclosure. To the contrary, the present disclosure is intended to cover alternatives, modifications, and equivalents.

The present disclosure is directed to an anti-skate device that may be coupled to a drive axle of a vehicle in order to prevent or mitigate a potentially dynamic response of a vehicle assembly including the drive axle and associated suspension system. This dynamic response may refer, for example, to a situation in which the tires on one or both sides of the drive axle have either a reduced contact, or entirely lose contact, with the ground surface, otherwise known as vehicle skate. Such an event may, for example, affect a driver's control of the vehicle. In certain situations, if the dynamic response occurs at a natural frequency of the assembly, movement of the tires may be magnified, leading to further loss of contact between the tires and the ground.

Axle tramp motion describes a rotational displacement of the drive axle with respect to the vehicle, which results in an oscillation of the distances between each side of the drive axle and the vehicle body. During axle tramp motion, when the drive axle rotates in a first rotational direction, a first side of the drive axle will move toward the vehicle body, thereby decreasing the distance between this first side and the vehicle body; at the same time, a second side of the drive axle will move away from the vehicle body, thereby increasing the distance between this second side and the vehicle body. After a first direction of axle tramp motion is completed, the drive axle rotates in a second rotational direction that is opposite to the first rotational direction, and the axle tramp motion may alternate between first and second rotational directions according to a rotational frequency of the drive axle.

As used herein, the term "vehicle skate event" refers to a condition in which axle tramp motion occurs repeatedly in an oscillating manner. In accordance with various exemplary embodiments of the present disclosure, a vehicle skate event may be detected, for example, by measuring the relative position, or velocity, between the vehicle body and the drive axle over time, and determining threshold relative positions, or velocities, along with threshold rotational frequencies, which may then be compared with the detected relative position, or velocity.

A vehicle skate event may be induced, for example, by poor road conditions that cause the vehicle's tires to lose contact with the road and to move independently with respect to the vehicle's body. In one form, vehicle skate may be represented by a periodic oscillation of position and velocity at each side of the drive axle, wherein the oscillation is influenced by the magnitude of the input forces from the road and from the rotation of a propeller shaft. As would be understood by those of ordinary skill in the art, vehicle skate commonly occurs with rear-wheel or four-wheel drive vehicles having a body-on-frame construction due to the configuration of the propeller shaft and suspension in such vehicles. The periodic oscillation experienced during a vehicle skate event, may, however, also be related to the weight and length of the drive axle, vehicle weight, and/or the strength and location of the suspension elements, such as, for example, shock absorbers and other damping components, as would be further understood by those of ordinary skill in the art.

In body-on-frame types of vehicles, for example, there may be package constraints on the location of suspension elements. Such package constraints may cause the shock absorbers to be located inside the frame of the vehicle, which may reduce the efficiency of the damping forces (i.e., shock absorbers) to reduce the amplitude of the displacement at each side of the drive axle at a natural frequency of the assembly during a vehicle skate event.

The drive axle response during a vehicle skate event may, for example, take the form of a pendulum-like rotation of the drive axle that induces independent, offset, rolling dynamic responses from the suspension elements at either side of the vehicle. The dynamic responses may be related to one another because both sides are coupled to the drive axle and the response of each side is influenced by a rotational position of the drive axle. The responses may, however, also be independent of each other because the suspension elements at each side may operate independently, terrain may vary, and/or one side may be more naturally grounded, for example, by the rotational energy of the propeller shaft (which rotates in a specified direction to transmit power to a drive shaft within a housing of the drive axle). The responses are, therefore, offset in that they have generally periodic graphical representations, but the response at each side is out of phase with respect to the other side. Finally, the description of the oscillation as rolling refers to rotation of the vehicle body and the drive axle about axes that lie on, or are generally parallel to, a longitudinal axis of the vehicle.

Although vehicle skate may often arise in vehicles having a solid rear axle, the present disclosure is also applicable to other suspension types where similar rotational interaction between suspension displacements occurs.

The present disclosure contemplates devices and assemblies that include rotational damping components, which may apply forces to counteract vehicle skate without adding unnecessary springs to the system. Such devices may be implemented in accordance with various exemplary embodiments, as described below.

One exemplary embodiment of the present disclosure is a passive form of damping response by connection of rotational damping component in the form of a free-spinning mass to the rear axle of the vehicle, and as one non-limiting example of a rotational damper, there may be a viscous interface between the free-spinning mass and the rear axle. Such an interface may, for example, respond to the applied forces that may occur during a vehicle skate event.

Another exemplary embodiment of the present disclosure may include a rotational damping component in the form of a flywheel to store kinetic energy of a propeller shaft, which may then dissipate this stored energy during a skate event (i.e. when axle tramp is detected) to reduce the magnitude of the axle tramp by applying a damping torque to the housing of the drive axle about the pinion input shaft axis, using, for example, the 'skyhook' principle as further described in this disclosure. The available torque which can be applied to counter the rotation of the axle is a function of at least the flywheel's inertia and the rotational velocity of the axle.

In various exemplary embodiments, the flywheel may be located on the pinion nose of the rear axle of the vehicle, and may rotate concentrically with the pinion input shaft that is coupled to the propeller shaft of the assembly. The flywheel may build up inertia by forces transmitted through a bearing that is located between the flywheel and the pinion input shaft, which rotates in the direction of the propeller shaft. Accordingly, the flywheel may eventually achieve the same rotational velocity as the pinion input shaft.

When a vehicle skate event is detected, the flywheel may be alternately coupled to the pinion input shaft and to the drive axle or a differential housing of the drive axle. A torque may be applied, for example, by the flywheel to the drive axle by decoupling the flywheel from the pinion and coupling it to the drive axle. However, in various additional embodiments, it may be desirable to simplify the control algorithm by only coupling and decoupling the flywheel to the differential housing or to another part of the drive axle. The coupling to the drive axle may be timed, for example, to occur only during the portions of detected axle tramp motion when the drive axle and the flywheel are rotating in opposite directions at a rotational frequency in a range determined near a natural frequency of a drive axle assembly. In various embodiments of the present disclosure, for example, a rotational frequency in a range of about 7 Hz to about 15 Hz may be associated with axle tramp motion.

In accordance with various additional exemplary embodiments, the present disclosure contemplates a control algorithm to provide a coupling torque between the flywheel and a portion of the drive axle, such as, for example, the housing of the drive axle. The coupling torque may be proportional to a detected axle roll velocity, and may only be active for detected velocities for which coupling the flywheel will counter the axle rotation. In various embodiments, for example, it may be desirable to provide one or more transducers to detect an axle tramp motion by measuring the relative distances between each side of the rear axle and the vehicle body over time. When an axle tramp motion is detected by the transducers, the control algorithm may then provide the requisite coupling torque.

As above, the present disclosure contemplates an anti-skate device to provide rotational damping to a drive axle of an automobile. The anti-skate device can improve stability of the automobile, for example, when the vehicle experiences a dynamic response to a roadway condition, by providing rotational damping, either passively or selectively, in response to a relative movement between the rear axle and the body of the automobile. The scope of the present disclosure includes, but is not limited to, damping elements that provide damping forces against rotational movement of a drive axle, without requiring additional spring elements. Such anti-skate devices may, therefore, assist in reducing axle tramp motion, thereby improving the stability of the vehicle.

Figure 1:
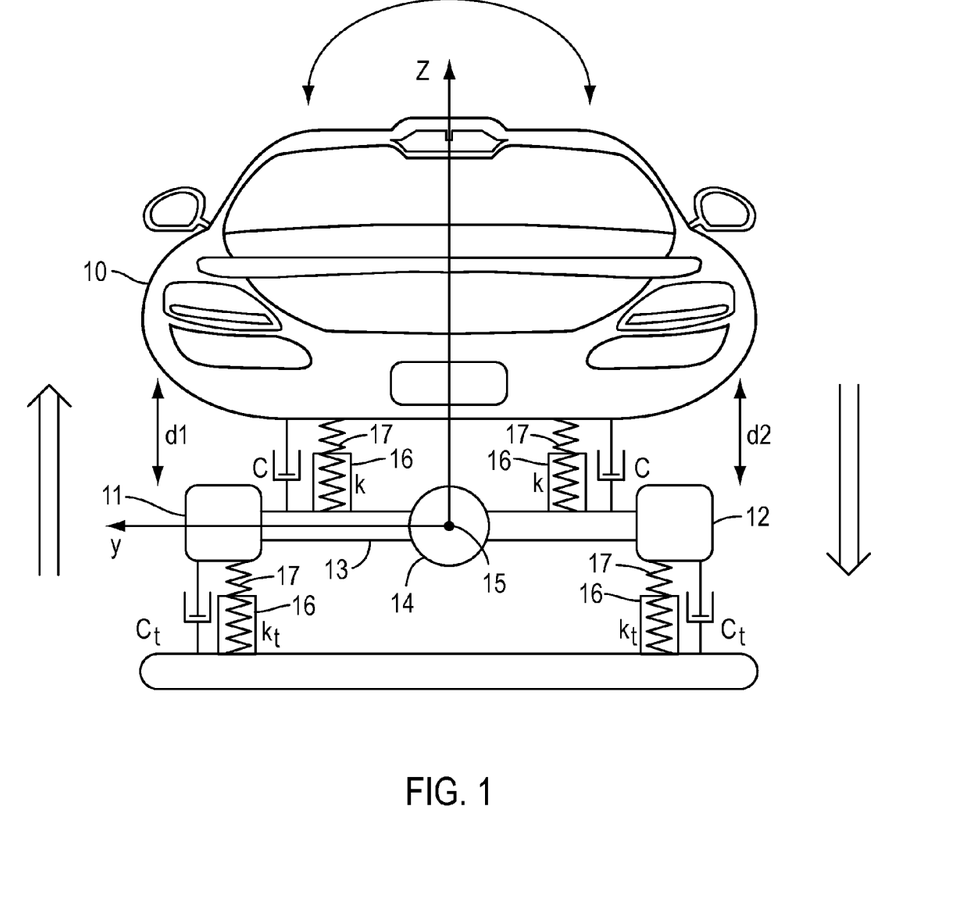
FIG. 1 is a schematic view of a vehicle body and components of a drive axle assembly illustrating movement during a vehicle skate event.

FIG. 1 shows the movement of a drive axle during a vehicle skate event. Because vehicle skate occurs more often with rear-wheel drive and four-wheel drive vehicles, the drive axle most frequently experiencing vehicle skate is in the rear of the vehicle (i.e., the rear axle). As above, however, the present disclosure further contemplates utilizing the anti-skate devices disclosed herein in vehicles having a drive axle located in the front of the vehicle, as it may be necessary to transmit power from the rear of the vehicle to the front of the vehicle.

As above, a vehicle skate event may be induced by a combination of forces related to rotation of a propeller shaft of the vehicle and movement of the vehicle's tires over uneven ground (e.g., road) surfaces. As illustrated in FIG. 1, a vehicle body 10 operating under normal conditions generally has similar distances d1 and d2 between the two sides of a rear axle 13 (i.e., a drive axle) where tires 11 and 12 are located. When the drive axle 13 begins to experience vehicle skate, the drive axle 13 may rotate about an axis 15 that is parallel to the longitudinal axis of the vehicle 10, and which is perpendicular to the Y and Z axes in the exemplary embodiment illustrated in FIG. 1. The rotation of the drive axle 13 may, however, not be precisely about the axis 15, due to the unequal forces acting on each side of the drive axle 13, which may be caused at least in part by the direction of rotation of a propeller shaft (not shown). These unequal forces may cause one side of the vehicle body 10 to be more grounded than the other, thus shifting the axis of rotation of the drive axle 13.

In the example illustrated in FIG. 1, a load on tire 11 decreases as the axle 13 rotates. At the same time, the distance d1 between the rear axle 13 and the vehicle body 10 decreases due to the relative movement of the vehicle body 10 with respect to the rear axle 13. While the distance d1 decreases, it is typical during vehicle skate for the distance d2 at the side of tire 12 to increase. Additionally, the decreased load on tire 11 may result in an increased load on tire 12.

The distances d1 and d2 between the vehicle body 10 and the rear axle 13 are related to the forces of shock absorbers 16 included in the independent suspension systems indicated as symbols k and C, as well as symbols $k_t$ and $C_t$, which are related to effective spring constants and damping of the tires 11 and 12. Spring components 17 typically produce forces that are generally proportional to the distance which the springs 17 are compressed or extended beyond an unloaded condition of the springs 17, while the shock absorbers 16 typically produce forces generally proportional to the rate of change of suspension displacement, in a direction opposing the suspension motion.

As the spring forces increase in response to the change in distance between the vehicle body 10 and the drive axle 13, these forces will eventually become large enough to stop the movement of the drive axle 13 in one direction and force the drive axle 13 to rotate oppositely with respect to the vehicle body 10. This change in the direction of rotation results in the distance d1 increasing while the distance d2 decreases, and is associated with a relative rotation of the vehicle body 10 and the rear axle 13 in opposite directions from those which are shown in FIG. 1.

The relative rotation referenced above may continue back and forth as long as the axle tramp motion is large enough to load the spring components 17 on each side, subject to decay in amplitude generally proportional to the damping forces produced by the shock absorbers 16. This relative rotation creates a rolling oscillation of the drive axle 13 with respect to each side of the vehicle body 10. When this rolling oscillation occurs at a natural frequency of the drive axle assembly, and if the efficiency of the shock absorbers 16 in reducing the amplitude of oscillation is diminished by their location, it may result in reduced contact or a complete loss of contact between tires 11, 12 and the ground.

As noted above, certain oscillation frequencies may coincide with a natural frequency of the drive axle 13, as determined by its center of mass and its rotational inertia, as well as the distance from the axis of rotation to the tires 11, 12, and type, weight, and length of the drive axle 13. That is, the drive axle 13 may act like a pendulum having one or more natural frequencies. When the oscillation frequency matches one of the natural frequencies, the amplitude of displacement at either side of the drive axle 13 may be increased.

This increased amplitude of displacement also affects the distances d1 and d2, which, as mentioned above, are related to spring forces output by the suspension systems. Due to the overall dynamics of the rear axle 13, in combination with the spring and damper components of the suspensions systems, it is therefore possible to determine the natural frequencies of the entire assembly, and counter these natural frequencies by applying torque in opposition to the axle rotation.

While the natural frequencies of a drive axle assembly (e.g., drive axle 13) may be changed by adding more springs to the system, this may have undesirable side effects, such as, for example, reduced ride comfort or simply creation of different dynamics having additional natural frequencies. While linear damping components are commonly included in suspension systems to protect against the potentially unstable dynamics of spring components, such linear damping components generally do not have sufficient strength to reduce vehicle skate in a significant manner, particularly if they are placed considerably closer to the centerline of the vehicle than the wheels, as is generally the case with live axle suspensions.

The strength of linear damping components (i.e. coefficient of damping) may be associated with ride comfort and having such linear damping components with damping constants which are high enough to reduce the amplitude of a natural frequency response may also result in a suspension that is overly stiff, unless the damping coefficient is actively controlled. While a stiff suspension may be desirable in certain contexts, the reduced ride comfort is not desirable in other contexts. The present disclosure provides a drive train assembly that reduces amplitude of displacement experienced during an event such as rear vehicle skate while improving stability and having minimal effect on ride comfort.

Figure 2:
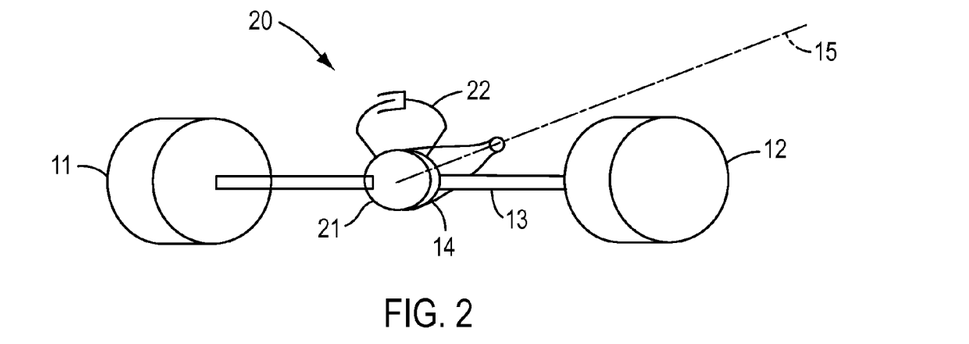
FIG. 2 is a perspective view of an exemplary embodiment of an anti-skate device in accordance with the present disclosure.

A first exemplary embodiment of an anti-skate device 20 is illustrated in FIG. 2. This first embodiment of an anti-skate device according to the present disclosure may be passive in nature, in that it may be constantly coupled to a housing 14 of the drive axle 13 illustrated in FIG. 1. The coupling of the anti-skate device 20 may take several exemplary forms as described below.

In one form, the anti-skate device 20 may include a free-spinning mass 21 that is coupled to the drive axle 13 by a rotational damper 22. The free-spinning mass 21 may be large enough to have an inertial mass that maintains a rotational position in space. An effective inertial mass may, for example, refer to an amount of mass that effectively resists changes in velocity. The concept of maintaining a fixed position in space is similar to the "skyhook" principle, which is known to those skilled in the art as being related to a control algorithm for active or semi-active damping to maintain a relative position with respect to a fixed position in space rather than a height of a vehicle body. However, even in passive systems with no active control, it may be possible to achieve a sufficiently fixed rotation position to provide a damping torque.

In various embodiments, for example, when the drive axle 13 rotates with respect to the free-spinning mass 21, the rotational damping of the coupling between the drive axle 13 and the free-spinning mass 21 may produce a force against the direction of rotation. The free-spinning mass 21 of the anti-skate device 20 may be induced into rotational movement by the rotation of the rear axle 13. Although the free-spinning mass 21 is no longer in its original rotational position, there may be desirable effects of the induced rotation. For example, the induced rotational movement of the free-spinning mass 21 is in opposition to rotation of the rear axle 13 (which is rotating in the opposite direction during a vehicle skate event). Furthermore, having the free-spinning mass 21 rotate opposite to the rear axle 13 may create an even stronger damping force through the rotational damper 22, as the damping may be related to the relative velocity of the components.

The first embodiment of the present disclosure may take physical form in the following example. As would be understood by those of ordinary skill in the art, the embodiment described below and with relation to FIG. 2 is exemplary only is not intended to limit the scope of the present disclosure and claims in any manner. As illustrated in FIG. 2, the free-spinning mass 21 may be a circular weight coupled to the drive axle 13 at a differential housing 14. The differential housing 14 is connected to a housing of the drive axle 13 around a point of connection between a propeller shaft (not shown) that may extend generally parallel to axis 15 (see FIG. 1) and the drive shaft (not shown) that is housed within the drive axle 13.

The differential housing 14 and the attached portion(s) of the drive axle 13 may be larger than the rest of the drive axle 13 due to the presence of gears used to transmit power from the propeller shaft to the drive shaft. Due to the size of the differential housing 14, it may be a suitable location for a free-spinning mass having sufficient size to provide a rotational damping coefficient that reduces the amplitude of a natural frequency response. In various embodiments, for example, the free-spinning mass 21 may form part or all of a wall of the differential housing 14 that is located opposite to where the propeller shaft meets the differential housing 14.

In various exemplary embodiments, the free-spinning mass 21 may be coupled to the differential housing 14 by the rotational damper 22 in order to provide a damping coefficient in response to rotation of the drive axle 13. In various embodiments, for example, the rotational damper 22 may be a viscous interface between the free-spinning mass 21 and the remainder of the differential housing 14, another part of the drive axle 13, or the propeller shaft to which the free-spinning mass 21 is coupled.

The viscous interface forming the rotational damper 22 may be located around the periphery of the free-spinning mass 21. In various additional embodiments, the viscous interface may be located between a face of the free-spinning mass 21 and a surface of the drive axle 13, such as a surface of the differential housing 14. Those of ordinary skill in the art would understand, however, that the viscous interface could be located in various locations depending upon a particular application. Furthermore, in order to increase the damping coefficient, the viscous interface may be designed and placed to maximize the surface area of the free-spinning mass 21 and the differential housing 14 (or drive axle 13) that is in contact with the viscous interface.

The damping coefficient may also be related to the viscosity of the fluid used in the viscous interface. In various exemplary embodiments, valves (not shown) or other fluid passages may, therefore, be used to control the movement of a viscous fluid within the rotational damper 22, as would be known by those ordinarily skilled in the art. In accordance with various embodiments, for example, it may be possible to limit the rotational movement of the free-spinning mass 21, or it may be possible to provide for unlimited rotational movement, via such valves. In various embodiments, the viscous fluid may be a silicone fluid such as polydimethylsiloxane (PDMS) or another form of silicone oil. Those of ordinary skill in the art would understand, however, that the scope of the present disclosure is not limited to this particular viscous fluid and that any viscous fluid having sufficient rheological properties may be suitable. In various additional embodiments, the rotational damper 22 may also be sealed to prevent the viscous fluid from escaping. Those of ordinary skill in the art would further understand that damping forces may be applied via any methods and/or techniques known in the art.

In various further embodiments, the rotational damper 22 may rely on electronic control. This electronic control may, for example, be a low-level passive current that may create a resistance to movement, or it may be a selectively applied current as discussed with respect to later embodiments.

Figure 11:
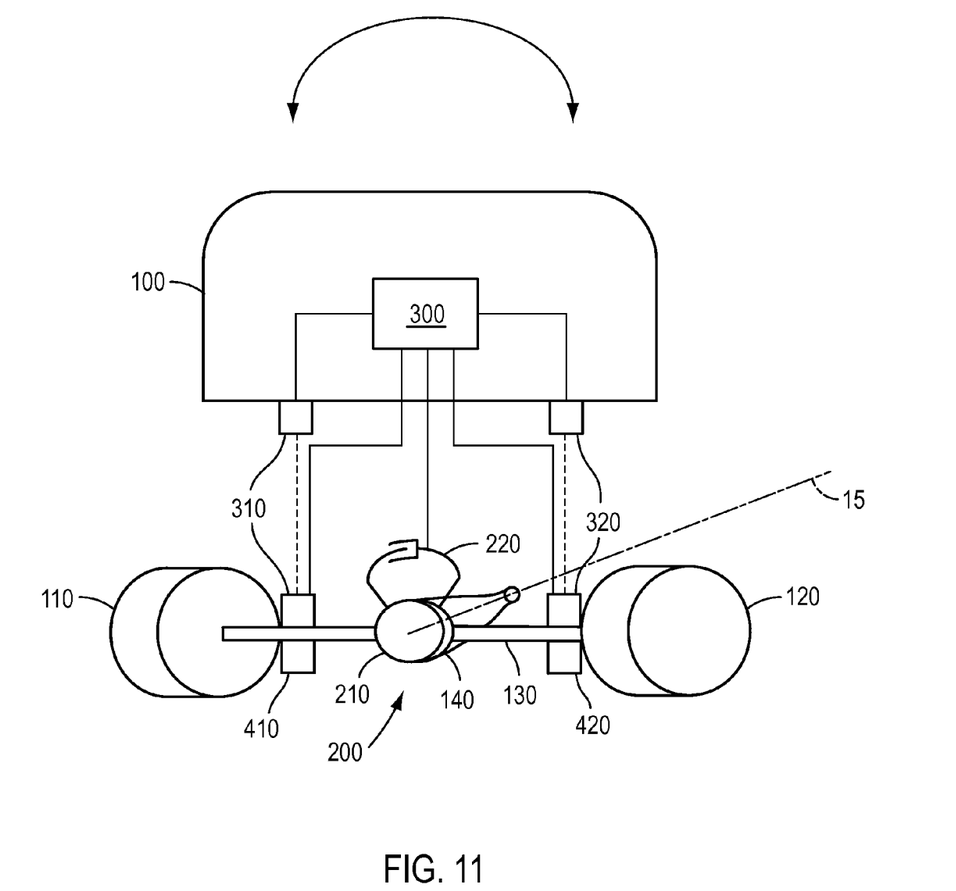
FIG. 11 is a schematic view of an exemplary embodiment of a vehicle control system in accordance with the present disclosure connected with a rotational damping component of an anti-skate device in accordance with the present disclosure.

FIG. 11, for example, illustrates an exemplary embodiment of the present disclosure including a vehicle control system and transducers. As shown in FIG. 11, a vehicle body 100 is located away from and generally parallel to a drive axle 130 in a resting position, or in the middle of each oscillation of the drive axle 130 as described above. Tires 110 and 120 are located at either side of the drive axle 130. A differential housing 140 may be located at an intersection of the drive axle 130 with an axis 150 that is parallel to a longitudinal axis of the vehicle body 100. Axis 150 may be parallel to a propeller shaft (not shown) that provides power to the drive axle 130.

In various embodiments, for example, as illustrated in FIG. 11, the differential housing 140 may house an anti-skate device 200, which includes a free-spinning mass 210 and a rotational damper 220. While FIG. 11 depicts an anti-skate device that is similar to the anti-skate device 20 depicted in FIG. 2, those of ordinary skill in the art would understand that device 200 is exemplary only and that any anti-skate device in accordance with the present disclosure may be used in its place.

The anti-skate device 200 may be electrically connected to a vehicle control system 300 in order to provide active control of the anti-skate device 200. The control system 300 may include, for example, an existing vehicle control system such as the Electronic Control Unit (ECU) of the vehicle, or a dedicated control system, or control may be distributed among more than one vehicle control system, as would be understood by one ordinarily skilled in the art.

In various exemplary embodiments, transducers 310 and 320 may be provided on the vehicle body 100 and/or the drive axle 130 in order to measure a relative distance between each side of the drive axle 130 and the vehicle body 100. The transducers 310 and 320 may also be electrically connected to the vehicle control system 300, so that the measured distances may be used as inputs in order to control a damping torque applied by the rotational damper 220 of the anti-skate device 200. The control algorithm may be implemented according to any of the presently disclosed embodiments.

In various additional embodiments, it may be desirable to provide transducers 410 and 420 on the drive axle 130, as also shown in FIG. 11. These transducers 410 and 420 may be provided in lieu of or in addition to the transducers 310 and 320, in order to measure distances between each side of the drive axle 130 and a road surface (not shown). There may be scenarios, for example, in which transducers 410 and 420 may increase the accuracy of the measured rotation, because they measure absolute rotation with respect to the road, as opposed to relative rotation with respect to the vehicle body 100. Alternatively, velocity or acceleration transducers (not shown) may be provided in lieu of or in addition to transducers 310 and 320, or 410 and 420.

Figure 3A:
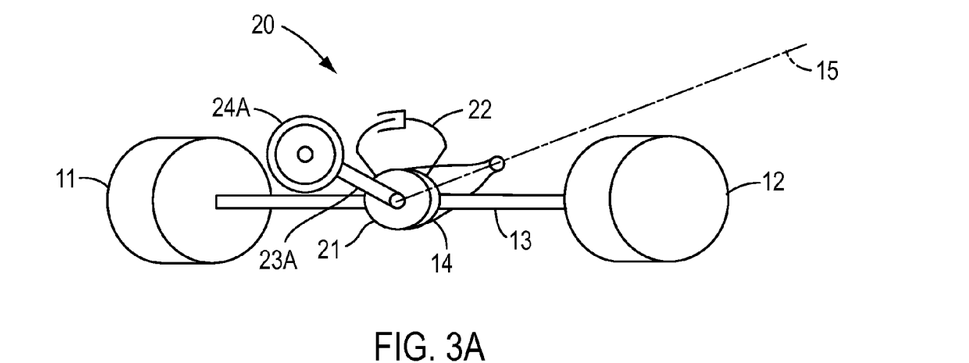
FIG. 3A is a perspective view of another exemplary embodiment of an anti-skate device in accordance with the present disclosure.
Figure 3B:
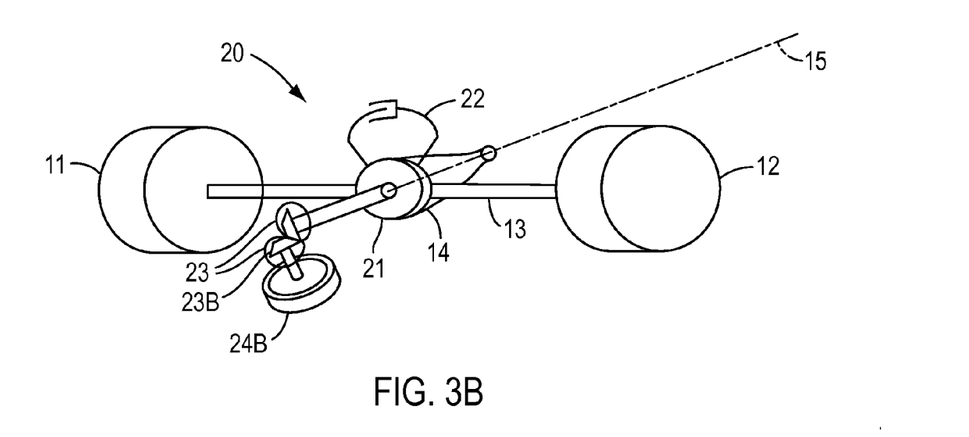
FIG. 3B is a perspective view of another exemplary embodiment of an anti-skate device in accordance with the present disclosure

As illustrated in FIG. 3A, in a second embodiment of the present disclosure, a free-spinning mass 21 may be connected by a connecting shaft 23A to an additional mass 24A. This connection may increase the effective inertial mass of the free-spinning mass 21, thereby increasing the damping torque that it may provide in response to relative rotational velocities. The connecting shaft 23A may itself be rotatable and comprise rotatable connections that transfer rotation of the free-spinning mass 21 to the additional mass 24A. Such a connecting structure may be implemented in a number of exemplary ways, including as multiple parts, as discussed below. As illustrated in FIG. 3B, in various embodiments, rotation of the free-spinning mass 21 may be transferred to the additional mass 24B through at least one pair of intersecting crown gears 23 that comprise a part of a connecting linkage 23B. The intersecting crown gears 23 may be angled to permit the additional mass 24B to be oriented in a plane that is different from the plane of rotation in which the free-spinning mass 21 is provided, so that the additional mass 24B may be suitably located with respect to package constraints of the vehicle body 10. In various embodiments, for example, the intersecting crown gears 23 may intersect at a 90 degree angle as illustrated in FIG. 3B.

The use of angled crown gears in the connecting linkage 23B, for example, may also allow for selection of a particular gear ratio selected to further increase the effective inertial mass of the free-spinning mass 21 due to a multiplication of an amount of rotation actually experienced by the additional mass 24B achieved by using appropriately selected gears.

In various embodiments, for example, the additional mass 24B may be a spare tire that is already provided with the vehicle. Since a spare tire is typically present in most vehicles, this assembly would not substantially increase the overall weight of the vehicle. However, the use of the spare tire as the additional mass 24B may significantly increase an effective inertial mass of the free-spinning mass 21 as noted above. Furthermore, as illustrated in FIG. 3B, the crown gears at intersecting shafts of the connecting linkage 23B may be oriented perpendicular to one another. In this manner, a spare tire used as the additional mass 24B may be located below a vehicle body 10. Those of ordinary skill in the art would understand, however, that the additional mass 24B could take various forms, or that the connecting linkage 23B may be coupled to the drive axle 13 or to the differential housing 14 directly, and/or without the free-spinning mass 21.

Figure 4:
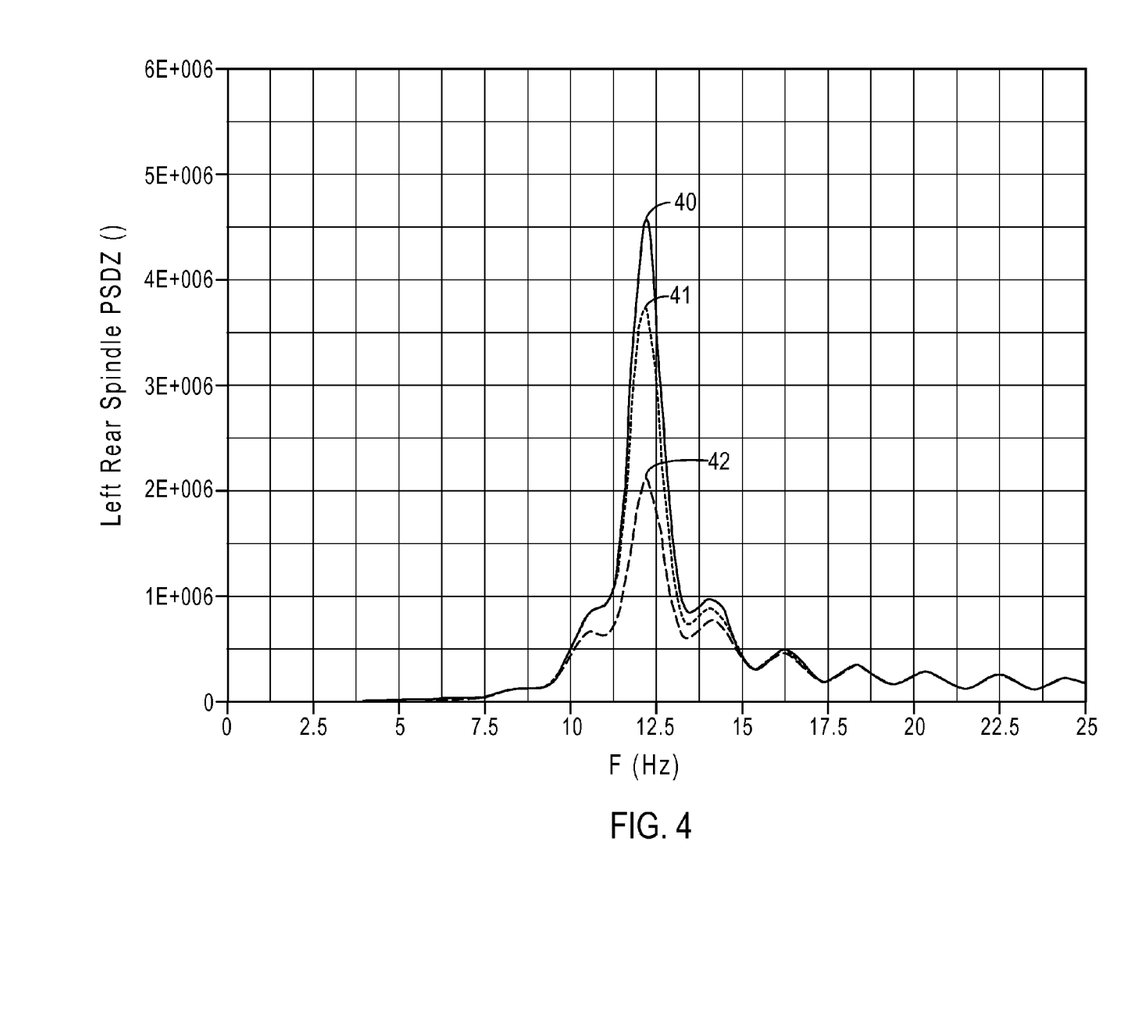
FIG. 4 is a graph illustrating dynamic responses generated by axle tramp motion for a conventional drive axle and for drive axles incorporating anti-skate devices in accordance with the present disclosure.

FIG. 4 provides a graphical representation of axle tramp motion for drive axle assemblies including a drive axle similar to the drive axle 13 of FIG. 1. As illustrated in FIG. 4, the dynamic responses of the axle tramp motion were determined for conventional solutions (solid line 40), as well as for implementations of the present disclosure according to the first embodiment of the passive anti-skate device (dashed line 41) and the second embodiment of the passive anti-skate device (dashed line 42). The dynamic responses were measured as maximum acceleration of one side of the drive axle during the axle tramp motion and were determined for input frequencies ranging from about 0 to about 25 Hz. The determined responses indicate a peak around 12 Hz, which corresponds to a natural frequency of the drive axle assemblies.

Implementation of the first and second embodiments of the present disclosure was determined to not affect this natural frequency in any significant way, but as illustrated in FIG. 4 these embodiments did dramatically lower the magnitude of the dynamic response. The lower peaks for the dashed lines 41 and 42 correspond to lower axle tramp motion peak velocities and distances travelled. Reducing axle tramp motion would tend to increase contact of the vehicle's tires with the road surface, thereby increasing stability and safety of the vehicle. The decreases in peak responses to the natural frequency of the drive axle assembly, as shown in dashed lines 41 and 42, were therefore determined to produce a benefit that is not recognized in the conventional solution (solid line 40).

Figure 5A:
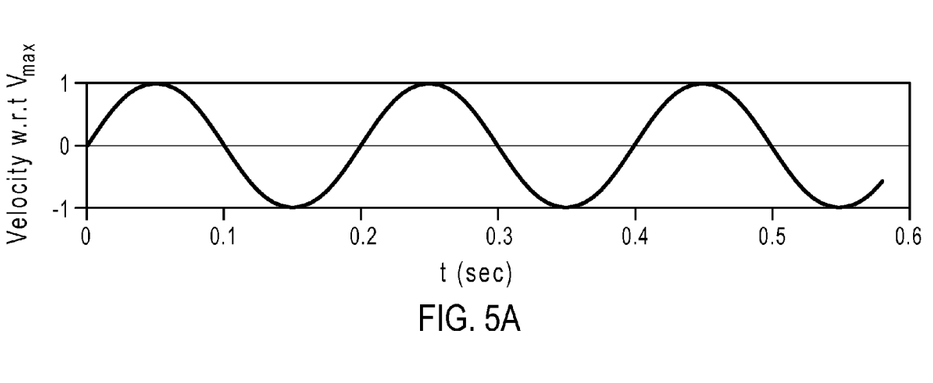
FIG. 5A is a graph illustrating a detected rotational velocity at one side of a drive axle during a vehicle skate event.
Figure 5B:
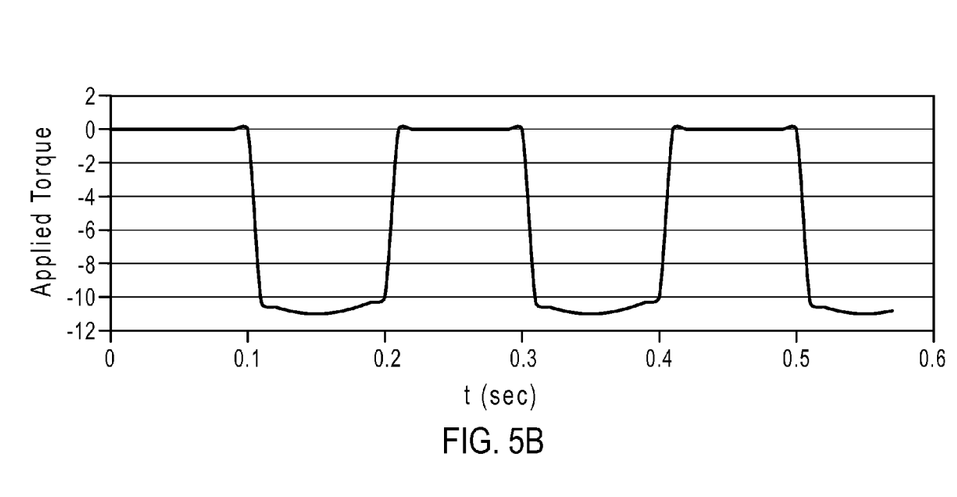
FIG. 5B is a graph illustrating how the anti-skate device selectively couples a flywheel and a drive axle based on the detected drive axle rotational velocity illustrated in FIG. 5A.

FIGS. 5A and 5B provide graphical representations of axle rotation and one possible control algorithm corresponding to the determined axle rotation depicted in FIG. 5A. In its simplest periodic form, relative axle rotation may be measured as a sinusoidal curve of velocities with respect to the vehicle, where "1" represents a maximum positive velocity and "−1" represents a maximum negative velocity, as shown in FIG. 5A. However, the dynamic periodic response of one or both sides of the drive axle may have different, more complex representations due to loss of tire contact with the road and/or the fact that one side of the vehicle may be more grounded than the other, as noted above.

One exemplary embodiment of a control algorithm for applying a selective damping torque to the drive axle may be related to a detected relative rotational velocity of the drive axle. In such an example, a rotational velocity of the drive axle may be detected by a gauge such as, for example, a transducer that may convert an optical detection of a distance between the vehicle body and the drive axle into an electrical signal that may be transmitted to a vehicle control system (see FIG. 11). The detected distances over time may be used to determine relative rotational velocities in a manner that would be known to one of ordinary skill in the art. The determined relative rotational velocity and rotational frequency, as illustrated in FIG. 5A, may then be used by the vehicle control system to implement a control algorithm, as illustrated in FIG. 5B, for selectively applying damping torque to the drive axle.

In another embodiment, it may be desirable to determine an absolute drive axle rotation relative to the road. This may provide enhanced accuracy and control.

In various exemplary embodiments, it may be desirable to rotationally damp the axle of the vehicle at detected velocities that are selected based on a direction of relative rotation of the drive axle with respect to the vehicle. In the example of FIGS. 5A and 5B, a flywheel having stored energy may be selectively coupled to a drive axle when a detected relative rotational velocity is positive. This example assumes that rotation of the flywheel is in a direction opposite to a positive direction of drive axle rotation relative to the vehicle. In various additional embodiments, it may also be desirable to provide a coupling torque that is proportional to an amplitude of the detected axle velocity.

Figure 6:
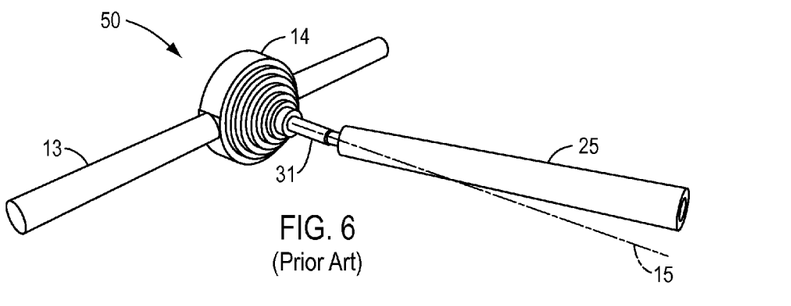
FIG. 6 is a perspective view of various components of a conventional drive train assembly.

FIG. 6 is a perspective view of the various components of a conventional drive train assembly 50 having a rear axle 13, a differential housing 14, and a longitudinal axis 15 that is generally parallel to the vehicle body (not shown) and typically parallel to a propeller shaft 25. A pinion input shaft 31 is coupled to the propeller shaft 25 and transmits rotational energy into the differential housing 14 to drive the shaft (not shown) within rear axle 13.

Figure 7:
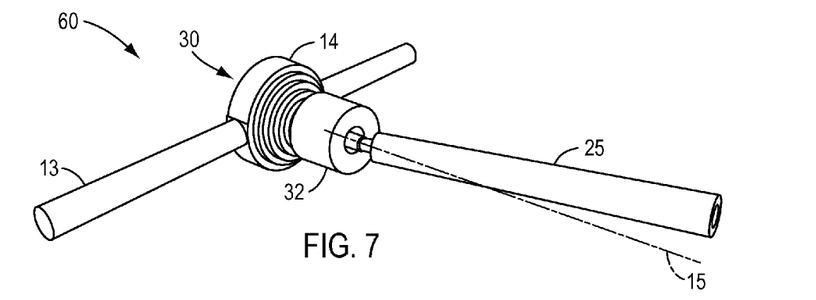
FIG. 7 is a perspective view of an exemplary embodiment of a drive train assembly including an anti-skate device in accordance with the present disclosure.
Figure 8:
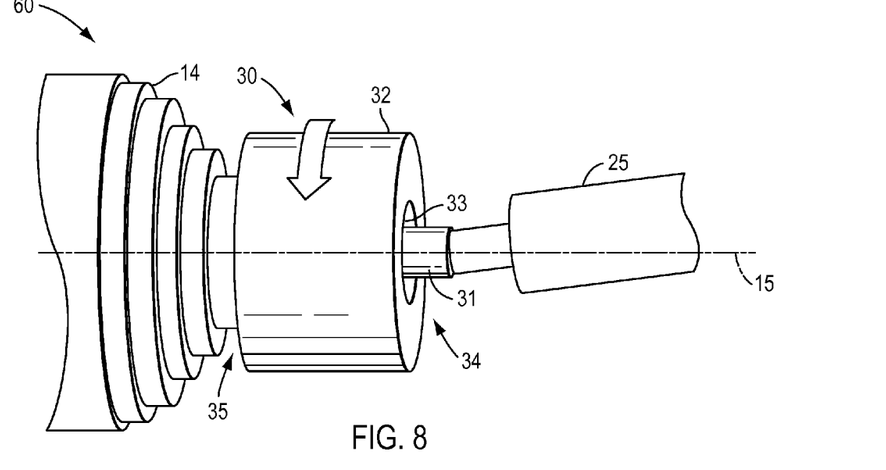
FIG. 8 is a perspective view of the drive train assembly of FIG. 7 showing rotation of a flywheel around a pinion input shaft and various couplings that may be made to transmit torque during a detected vehicle skate event.

FIGS. 7 and 8 are perspective views of a drive train assembly 60 (which is similar to the drive train assembly 50) including an anti-skate device in accordance with the present disclosure. In the exemplary embodiment of FIG. 7, an anti-skate device 30 includes a flywheel 32 around the pinion input shaft 31 (e.g., the flywheel 32 is concentric with the pinion input shaft 31). The flywheel 32 may be accelerated by rotation of the pinion input shaft 31 so that the flywheel 32 has rotational inertia, based on the selection of an appropriate flywheel 32 an effective inertial mass may be achieved.

In the exemplary embodiment of FIG. 8, the anti-skate assembly 30 is illustrated as having the flywheel 32 rotating around the pinion input shaft 31 via a bearing 33 for transmission of rotational energy. As further illustrated in FIG. 8, in various embodiments, there may be an additional transmission of rotational energy in the form of a coupling 34 between the flywheel 32 and the pinion input shaft 31. In various additional embodiments, there may also be a coupling 35 between the flywheel 32 and the differential housing 14 to apply torque passively or actively to the differential housing 14, and thereby to the drive axle 13, during a detected vehicle skate event.

In accordance with various embodiments of the present disclosure, energy may be stored in the flywheel 32 by coupling 34, which couples the flywheel 32 to the propeller shaft 25. This coupling 34 may take a number of forms, and the coupling 34 may itself be passive or active. In one exemplary embodiment, a passive coupling 34 between the flywheel 32 and the propeller shaft 25 may include a frictional engagement between a surface of the propeller shaft 25 (or one of its component parts such as the pinion input shaft 31) and a surface of the flywheel 32. This frictional engagement may accelerate the flywheel 32 to the rotational speed of the propeller shaft 25, thereby storing energy in the flywheel 32. The stored energy in the flywheel 32 may then be dissipated into the drive axle 13 to counteract an undesirable dynamic response during a detected vehicle skate event.

In accordance with various additional embodiments, when the control algorithm determines that the drive axle 13 should be rotationally damped, such as during a detected vehicle skate event, the flywheel 32 may be selectively coupled to the drive axle 25 via the coupling 35. The selective coupling 35 may be applied, for example, through the use of electrical signals from a vehicle control system (see FIG. 11). In various embodiments, for example, the electrical signals may be used to turn one or more electrical signals on or off according to the detected drive axle velocity. The magnitude of the electrical signals may determine strength of the electromagnetic attraction between the flywheel and the drive axle. In various additional embodiments, the electrical signals may control the opening and closing of valves, as known by those ordinarily skilled in the art, while using a rotational damper having a viscous interface similar to the embodiment set forth above with respect to the passive embodiment of the present disclosure. Similar to the electromagnetic approach, a magnitude of the electrical signals may determine the amount of opening or closing of the valves to achieve a proportional damping torque.

In accordance with various embodiments, for example, the application of torque may be controlled in a manner similar to the "skyhook" principle of dynamically adjusting suspension components relative to a reference point in space that does not change, as opposed to the relative height of the vehicle, which may change. By measuring a rotational velocity of the drive axle 13, it is possible to apply a force that would counter its movement in space without directly changing a distance between the vehicle body 10 and the drive axle 13. However, applying this force can ultimately stabilize the distance between the vehicle body 10 and the drive axle 13.

A free-spinning mass, a connecting shaft or linkage, or a flywheel in accordance with the present disclosure may be formed as one or multiple sections by, for example, bending, rolling, stamping, pressing, drawing, hydro-forming, molding, extrusion, cutting, and forging. Thus-formed sections can be joined via welding, adhesive, fastening, or other known joining technologies.

Furthermore, a free-spinning mass, a connecting shaft or linkage, or a flywheel in accordance with the present disclosure can be formed from various materials, including, for example, steel, aluminum, magnesium, fiberglass, nylon, plastic, or a composite thereof.

Figure 9:
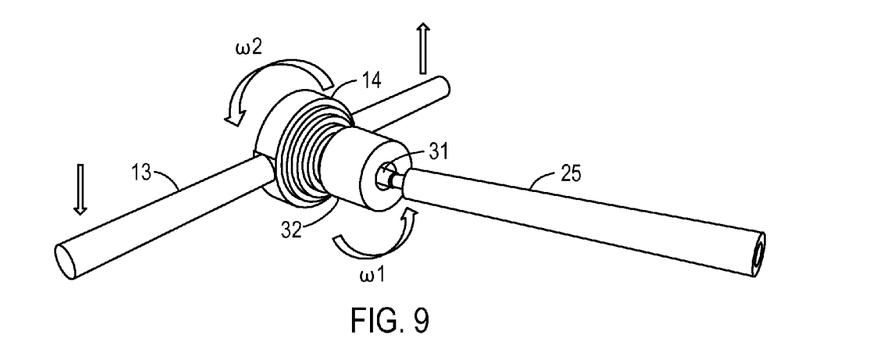
FIG. 9 is a perspective view of the drive train assembly of FIG. 7 during a detected vehicle skate event.

FIG. 9 illustrates the flywheel 32, as illustrated in the embodiment of FIG. 8, rotating with angular velocity $\omega 1$ and the drive axle 13 rotating with axle angular velocity $\omega 2$. As above, in various embodiments, transducers (not shown) may be provided on the drive axle 13 or on the vehicle body (not shown) to measure distances between each side of the drive axle 13 and the vehicle body. When vehicle tramp motion is detected within certain parameters related to a direction and frequency of relative rotation of the drive axle 13, the rotational inertia of the flywheel 32 may be used to selectively apply a proportional damping torque against the drive axle rotation and thereby diminish a magnitude of the axle tramp motion.

Figure 10A:
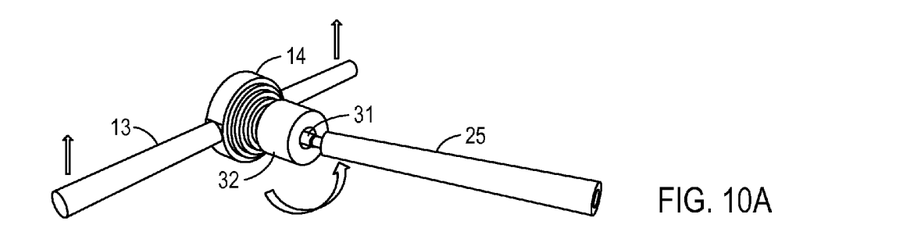
FIGS. 10A-10C illustrate various detected conditions of the drive train assembly of FIG. 7.

FIGS. 10A-C illustrate, for example, various detected conditions of the drive axle 13. In FIG. 10A, when both sides of the drive axle 13 move toward or away from the vehicle body (e.g., a vehicle body 10) in unison, then there is no detected rotation of the drive axle 13. Since there is no detected rotation of the drive axle 13, this type of drive axle motion does not trigger any coupling of the flywheel 32 to the drive axle 13.

Figure 10B:
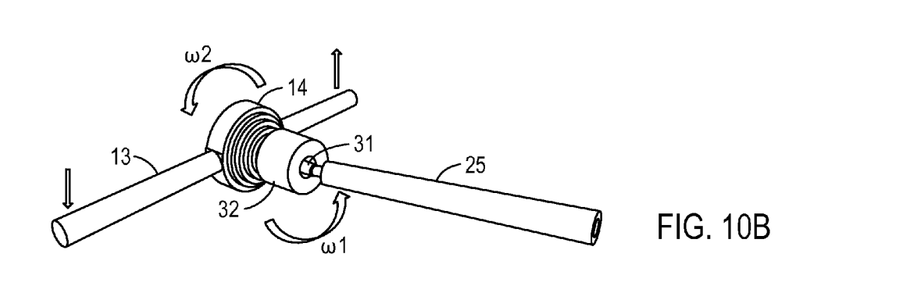

In FIG. 10B, there is a detected relative rotation of the drive axle 13, but since the detected relative rotation is in the same direction as the rotation of the flywheel 32, there is no coupling torque applied to the drive axle 13 (i.e., the rotation does not trigger any coupling of the flywheel 32 to the drive axle 13), since it would not assist in diminishing relative rotational velocity or magnitude of the axle tramp motion. However, the detected distances and velocities may be used to determine a frequency of the rotation to determine whether the drive axle is experiencing an axle tramp motion thereby causing a vehicle skate event.

Figure 10C:
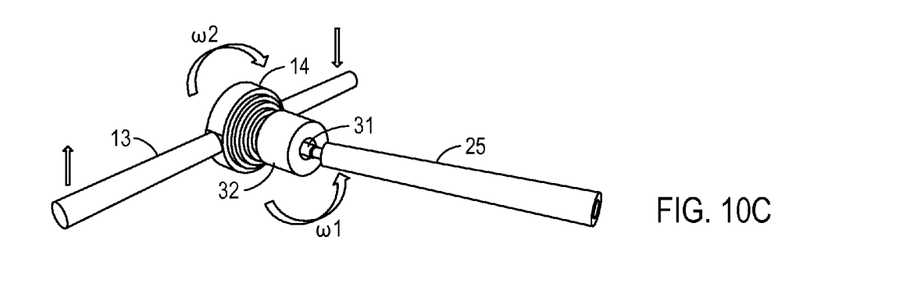

In FIG. 10C, the drive axle 13 is rotating in a direction opposite to the direction in which the flywheel 32 is rotating. Therefore, this may be an appropriate time to apply a rotational torque by coupling the flywheel 32 to the drive axle 13 using any of the exemplary coupling embodiments disclosed above. The coupling force may be proportional to a difference between $\omega1$ and $\omega2$. There may also be a damping factor for applied torque that limits a practical application below a theoretical torque which may be generated by the coupling between the drive axle 13 and the flywheel 32.

An exemplary method of reducing a magnitude of an axle tramp motion of a motor vehicle in accordance with an exemplary embodiment of the present disclosure is set forth in the following description with reference to the embodiments of FIGS. 1-3 and 7-11. To reduce the magnitude of the axle tramp motion of a vehicle 10, for example, during a vehicle skate event, a rotational damping component 21, 32 may be coupled to a drive axle 13 of the motor vehicle 10 at, for example, a differential housing 14 of the drive axle 13. In various embodiments, for example, a free-spinning mass 21 may be coupled to the drive axle 13, as illustrated in the embodiments of FIGS. 2, 3A, and 3B. In various additional embodiments, a flywheel 32 may be coupled to the drive axle 13, as illustrated in the embodiments of FIGS. 7 and 8. In accordance with various further embodiments of the present disclosure, the rotational damping component 21, 32 may be selectively coupled to the drive axle 13, via, for example, a vehicle control system 300 (see FIG. 11), based on a detected velocity of the drive axle 13.

A coupling torque that is proportional to a velocity of the axle tramp motion may then be applied between the rotational damping component 21, 32 and the drive axle 13 to reduce the magnitude of the axle tramp motion.

As above, those of ordinary skill in the art would understand that the embodiments described above are exemplary only. Accordingly, it is within the scope of the present disclosure to combine any or all of the embodiments disclosed herein. For example, it may be desirable to combine a form of a passive rotational damping with a selectively applied form of active damping using a control algorithm similar to one of the exemplary embodiments set forth above. In another example, there may be two or more flywheels rotating in multiple directions.

While the present disclosure have been disclosed in terms of exemplary embodiments in order to facilitate a better understanding, it should be appreciated that the present disclosure can be embodied in various ways without departing from the scope thereof. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items. It will be apparent to those skilled in the art that various modifications and variations can be made to the devices and methods of the present disclosure without departing from the scope of its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. An anti-skate device for a motor vehicle, comprising:
a free-spinning body having an axis of rotation that is generally perpendicular to a drive axle of the vehicle, wherein the free-spinning body is coupled to the drive axle via a rotational damper, and wherein, during a vehicle skate event, the free-spinning body is configured to rotate in response to rotation of the drive axle in a direction opposite to the rotation of the drive axle.

2. The anti-skate device of claim 1, wherein the axis of rotation of the free-spinning body is substantially parallel to a propeller shaft that transmits a force to the drive axle.

3. The anti-skate device of claim 2, wherein the free-spinning body is coupled to a differential housing located at an intersection of the drive axle and the propeller shaft.

4. The anti-skate device of claim 3, wherein the rotational damper comprises a viscous interface between the free-spinning body and the differential housing.

5. The anti-skate device of claim 4, wherein the viscous interface comprises a viscous fluid.

6. The anti-skate device of claim 5, wherein the viscous fluid comprises a silicone fluid.

7. The anti-skate device of claim 6, wherein the silicone fluid comprises polydimethylsiloxane.

8. The anti-skate device of claim 1, wherein the free-spinning body is coupled to the drive axle by a connecting shaft or a connecting linkage.

9. The anti-skate device of claim 1, wherein the free-spinning body is connected to an additional mass by a connecting shaft or a connecting linkage to increase an effective inertial mass of the free-spinning mass.

10. The anti-skate device of claim 9, wherein the connecting linkage comprises a pair of intersecting crown gears that are angled with respect to one another to transmit a rotational movement of the free-spinning mass to a different plane of rotation.

11. The anti-skate device of claim 10, wherein the pair of intersecting crown gears intersect at a 90 degree angle.

12. The anti-skate device of claim 10, wherein the pair of intersecting crown gears have a gear ratio that further increases the effective inertial mass of the free-spinning mass.

13. A method of reducing a magnitude of an axle tramp motion of a motor vehicle, comprising:

coupling a rotational damping component to a drive axle of the motor vehicle; and applying a coupling torque between the rotational damping component and the drive axle that is proportional to a velocity of the axle tramp motion.

14. The method of claim 13, wherein coupling the rotational damping component to the drive axle comprises coupling a free-spinning mass or a flywheel to the drive axle.

15. The method of claim 13, wherein coupling the rotational damping component to the drive axle comprises coupling the rotational damping component to a differential housing of the drive axle.

16. The method of claim 13, wherein coupling the rotational damping component to the drive axle comprises selectively coupling the rotational damping component to the drive axle based on a detected velocity of the drive axle.

17. The anti-skate device of claim 1, wherein, during the vehicle skate event, the free-spinning body is configured to rotate in response to the rotation of the drive axle to reduce a magnitude of an axle tramp motion of the drive axle.

* * * * *